United States Patent [19]

Shibata et al.

[11] Patent Number: 4,726,751
[45] Date of Patent: Feb. 23, 1988

[54] HOT-RUNNER PLASTIC INJECTION MOLDING SYSTEM

[75] Inventors: Itsuo Shibata; Tetsuo Uchida, both of Hiratsuka, Japan

[73] Assignee: Ju-Oh Trading Company, Ltd., Kanagawa, Japan

[21] Appl. No.: 817,855

[22] PCT Filed: Feb. 27, 1985

[86] PCT No.: PCT/JP85/00091

§ 371 Date: Dec. 30, 1985

§ 102(e) Date: Dec. 30, 1985

[87] PCT Pub. No.: WO85/03904

PCT Pub. Date: Sep. 12, 1985

[30] Foreign Application Priority Data

Feb. 28, 1984 [JP] Japan ................. 59-37121
May 14, 1984 [JP] Japan ................. 59-96276
Sep. 7, 1984 [JP] Japan ................. 59-187355
Nov., 1984 [JP] Japan ................. 59-231057

[51] Int. Cl.⁴ ............................ B28B 17/00
[52] U.S. Cl. ............................ 425/144; 425/549; 425/588
[58] Field of Search ............... 425/135, 143, 144, 547, 425/549, 564, 570, 572, 588

[56] References Cited

U.S. PATENT DOCUMENTS

| | | | |
|---|---|---|---|
| 3,339,227 | 9/1967 | Ehrenfreund | 425/144 |
| 3,520,026 | 7/1970 | Stidham et al. | 425/547 |
| 4,279,588 | 7/1981 | Gellert | 425/568 |
| 4,370,115 | 1/1983 | Miura | 425/144 |
| 4,386,898 | 6/1983 | Sera | 425/588 X |
| 4,438,064 | 3/1984 | Tsutsumi | 425/549 X |

FOREIGN PATENT DOCUMENTS

| | | | |
|---|---|---|---|
| 0056869 | 5/1976 | Japan | 425/143 |
| 0039417 | 3/1983 | Japan | |
| 0051126 | 3/1983 | Japan | 425/144 |
| 0171932 | 10/1983 | Japan | |
| 1467180 | 3/1977 | United Kingdom | 425/144 |

Primary Examiner—Charles Hart
Attorney, Agent, or Firm—Gerald J. Ferguson, Jr.; Michael P. Hoffman; Michael J. Foycik, Jr.

[57] ABSTRACT

In a hot-runner plastic injection system, part of a resin passage connecting the nozzle of an injection molding machine and cavities of a mold adjacent to each of the cavities is formed of a tubular member of material which can be heated by high frequency induction heating. High frequency induction heating windings are wound around the tubular members and are connected to a high frequency power source in series with each other. There is provided a temperature controller for controlling the temperature of the tubular members by controlling the power to be supplied to the heating windings.

30 Claims, 11 Drawing Figures

HOT-RUNNER PLASTIC INJECTION MOLDING SYSTEM

FIELD OF THE INVENTION

This invention relates to a plastic molding system, and more particularly to a hot-runner plastic molding system.

BACKGROUND OF THE INVENTION

In contrast to a cold-runner plastic injection molding system in which molten resin loaded in a resin passage connecting the nozzle of a plastic injection machine to each cavity of a mold (i.e., a runner) is cooled to harden together with the molten resin loaded in each cavity through the resin passage (to form an article) and ejected from the mold upon the opening of the mold, there has been known a hot-runner plastic injection molding system in which only the resin in each cavity is hardened by cooling and ejected from the mold upon the opening of the mold while the resin in the resin passage is kept in a molten state and is loaded into the cavity in the following molding cycle.

In hot-runner plastic injection molding, "severing" of the resin at the gates upon mold opening has been a major problem. For example, though there is known a hot-runner plastic injection molding system in which the resin passage for introducing molten resin from the nozzle of a plastic injection machine into each cavity of a mold is heated with an electric resistance heater from outside the resin passage to keep resin in the resin passage in a molten state, it is difficult to keep constant the temperature of resin in the resin passage near the gate of the cavity since the part of the resin passage near the gate is positioned near a cavity plate which is generally being cooled with cooling water and accordingly the temperature thereof changes by a large amount when the mold is opened or closed. When the resin temperature at the gate is too high, resin in the gate is apt to string upon mold opening, and when the resin temperature at the gate is too low, resin in the gate can harden to close the gate and prevent injection therethrough in the next molding cycle. Further, when the resin temperature at the gate is excessively high, drooling is apt to occur.

In order to overcome such problems, there has been developed a hot-runner plastic injection molding system in which a mechanical valve means is provided in each gate and the valve means is closed upon mold opening to prevent stringing and drooling while resin near the gate is constantly heated to a temperature sufficient to keep the resin in a molten state. However, this molding system is disadvantageous in that the valve means is apt to break down due to high pressure imparted thereto during the injection stroke of each molding cycle, and since opening and closure must be repeated a great number of times. Further, due to the complicated structure of the valve means, the overall size of the system is enlarged.

In another hot-runner plastic injection molding system, a pointed heater element is disposed in the resin passage in opposition to the gate and the resin in the gate is positively cooled to harden it before mold opening thereby preventing stringing and drooling, and the heater element is quickly heated immediately before the injection stroke of the next molding cycle to melt the hardened resin in the gate to permit injection therethrough. This type of hot-runner plastic injection molding system is generally referred to as an intermittent heating type hot-runner plastic injection molding system. However, various problems have been encountered with the intermittent type hot-runner plastic injection molding system. For example, it takes a long time to melt the hardened resin in the gate, lengthening the injection cycle time; also the pointed tip is apt to break or abrade especially when glass fiber filled resin is being molded. Further, since the temperature of the heater element is apt to be higher at the base portion than at the tip, if the tip of the heater element is heated to a temperature sufficient to instantly melt the hardened resin in the gate, the resin surrounding the base portion of the heater element is apt to be burnt or decomposed.

Further, since the conventional hot-runner plastic injection molding systems are arranged to heat a desired part, e.g., the gate of a cavity, by heat transfer from a resistance heater, it is very difficult to control the temperature of the desired part to a desired temperature owing to poor thermal response, and especially in the case of a multiple cavity mold having a plurality of cavities, it is very difficult to attain a gate temperature that is uniform for all the cavities (to maintain a good thermal gate balance). Further, resistance heaters frequently burn out.

OBJECT OF THE INVENTION

In view of the foregoing observations and description, the primary object of the present invention is to provide hot-runner plastic injection molding system in which the gate temperature for all the cavities of a multiple cavity mold can be controlled with high accuracy so that a good thermal gate balance can be obtained, and accordingly molding operation can be effected successfully without stringing, drooling, gate-clogging or the like, without use of a complicated mechanism such as a mechanical valve, an intermittent heating device or the like.

DISCLOSURE OF THE INVENTION

In the hot-runner plastic injection molding system of the present invention, the part of the resin passage for introducing molten resin from the nozzle of a plastic injection machine into the cavities (generally comprising a sprue and runners) adjacent to each gate is formed by a tubular member formed of material which can be heated by high frequency induction heating. High frequency induction heating windings are wound around the tubular members and are connected to a high frequency power source in series with each other. A control means is provided for controlling the temperature of the tubular members by controlling the power to be supplied to the high frequency induction heating windings.

When the heating windings are supplied with high frequency current from the high frequency power source, the tubular members are heated by electromagnetic induction. Heating by electromagnetic induction is advantageous in thermal response over heating by heat transfer from a resistance heater. That is, in the case of heating by heat transfer from a resistance heater, ringing is apt to occur before the temperature of the tubular member converges on the target temperature. For example, when the temperature of the tubular member reaches the target temperature, the temperature of the resistance heater has become higher than the target temperature, and therefore the temperature of the tubular member can continue to rise after the heater is de-energized. Further, when the temperature of the tubular member is lowered below a predetermined value and the heater is energized, the temperature of the tubular member can continue to decrease before heat from the heater is actually transferred to the tubular member. On the other hand, in the case of induction heating, the tubular member itself quickly generates heat, and accordingly, the temperature of the tubular member can be controlled with high accuracy. Further, in the case of heating by heat transfer from the heater, the temperature of the member to be heated (the tubular member) varies substantially depending upon the contact between the heater and the member to be heated. On the other hand, in the case of heating by electromagnetic induction heating, a slight displacement of the relative position between the heating winding and the member to be heated has little affect on the temperature of the member to be heated, and accordingly the resin temperature near the gates can be precisely controlled, thereby facilitating establishment of a good gate balance. Further, since the induction heating winding is simply formed of a winding of a conductive wire, it can be wound around the tubular member up to a portion close to the gate to directly heat the part of the tubular member close to the gate. Therefore, the temperature difference between the tip portion (portion near the gate) and the base portion (portion remote from the gate) of the tubular member can be minimized so that the tip portion can be heated to a high temperature sufficient to melt the resin in the gate without fear of heating the base portion to an excessively high temperature which can cause burning or decomposition of the resin surrounding the base portion. By connecting in series the heating windings with each other, the gate balance can be easily kept since, for example, change caused by the aging of each heating winding circuit acts on the electric current flowing through all the heating windings. That is, if the heating windings are connected to the power source in parallel, when the resistance of one of the heating winding circuits is increased, the power supplied to the heating winding circuit is reduced to lower just the temperature of the tubular member around which the heating winding is wound. On the other hand, if the heating windings are connected in series, increased resistance of one of the heating winding circuits uniformly reduces the power to be supplied to all the winding circuits, lowering the temperature of all the tubular members evenly, whereby the gate balance can be easily maintained. It has been experimentally found that the number of turns of each heating winding may be from several to a dozen or more. Therefore, if the heating windings are connected in parallel, the load becomes too small to supply each winding with sufficient power. Further, the high frequency induction heating effect also depends upon the distance between the heating winding and the power source, i.e., the line resistance loss, taking into account the skin effect, and accordingly, when the heating windings are connected in parallel, the distances between the heating windings and the power source must be uniform or the number of turns or the like must be individually adjusted for each winding, taking into account the differences in the distance, otherwise, the gate balance will be broken. Also from this viewpoint, the system of this embodiment in which the heating windings are connected in series is advantageous. Further, the system of this embodiment is advantageous in that the structure of the parts associated with each gate of the cavities can be substantially simplified since the resin near the gates can be heated by winding a conductive wire around the tubular member by several to a dozen or more turns. Therefore, hot-runner injection molding can be realized using a mold having a large number of cavities in a given area or a mold having a plurality of gates for each cavity. As the control means for controlling the temperature of the tubular member to a target temperature, there can be used a circuit which detects the actual temperature of the tubular member and adjusts or turns on and off the power to be supplied to the heating windings from the power source according to the detected temperature of the tubular member.

As is well known, it is easy for those skilled in the art to find a critical resin temperature at which neither drooling and stringing or gate-clogging will occur as long as the resin temperature near the gates can be precisely controlled. Accordingly, in the hot-runner plastic injection molding system of the present invention, hot-runner plastic injection molding can be successfully carried out without using a complicated mechanism such as a mechanical valve, an intermittent heating device or the like. Further, in the case of the system of the present invention, there is no heater element disposed in the resin passage, unlike the intermittent heating type system, and accordingly injection pressure loss is minimized and there is hardly any possibility of breakdown of the system due to a breakage of the heater element. Further, since the heating winding itself generates little heat when energized, the heating windings seldom burn out.

In one embodiment of the present invention, a gate balance adjustment circuit can be connected in parallel to each heating winding as occasion arises.

As the gate balance adjustment circuit, a capacitor, winding and resistor can be used. For example, when capacitors are connected in parallel to selected heating windings of a plurality of heating windings, the temperatures of the tubular members around which the selected heating windings are wound are raised and the temperatures of the other tubular members are lowered. When windings or resistors are connected in parallel to selected heating windings, the temperatures of the tubular members around which the selected heating windings are wound are lowered and the temperatures of the other tubular members are raised. The degree of the temperature change by the gate balance adjustment circuit depends upon the value of the gate balance adjustment circuit.

Thus, by connecting one or more gate balance adjustment circuit in parallel to one or more heating coils and properly selecting the value of the gate balance adjustment circuit(s), fine adjustment of the gate balance can be effected.

When a resistor is used as the gate balance adjustment circuit, power loss occurs. From this viewpoint, a capacitor or a winding is more advantageous than a resistor.

Since high frequency power is used in the hot-runner plastic injection molding system, noise is apt to mingle in with the signals when the temperature of the tubular member is detected by a thermocouple, and if the thermocouple is shielded in order to prevent the noise from mingling in with the signals, the structure associated with the gate is complicated, which is not desirable as it makes it difficult to miniaturize the overall system.

The thermoelectromotive force of the thermocouple (e.g., CA) is very weak, e.g., several mV, and the S/N ratio is very much decreased due to induction in a high output high frequency magnetic field, making precise temperature detection difficult. For example, it is preferred that the portion of the tubular member adjacent to the gate be very thin (e.g., about 7 mm in diameter). In order to detect the temperature of such a thin portion, the thermocouple must be as thin as about 0.5 mm in diameter (the measurement being of the outer diameter of the sheath) and accordingly the electric resistance inherently becomes high. As is well known, the likelihood of noise being mixed in increases with the increase in electric resistance. Even when both the thermocouple and the compensating conductive wire are shielded together, it is very difficult to completely cut noise.

Accordingly, in one preferred embodiment of the present invention, there is provided a switching means for periodically interrupting a high frequency power supply for a predetermined time interval, for instance, for 10 milliseconds every 0.5 seconds, and for permitting read-out of the output of the temperature detecting means.

In this embodiment, the high frequency power is turned off when the output of the temperature detecting means is read and accordingly the temperature can be detected without the influence of a high frequency magnetic field.

In still another preferred embodiment of the present invention, the temperature control means receives a temperature signal from a temperature detecting means which detects the temperature of the tubular member, preferably the temperature of the tip thereof, and controls the power to be supplied to the heating windings, thereby controlling the temperature of the tubular members to a desired value, and at the same time, supplies a large power to the heating windings in response to a signal from the injection machine.

In this embodiment, the resin temperature near the gates is normally kept at a low value sufficient to prevent drooling and/or stringing and is abruptly raised immediately before the injection stroke, thereby melting the resin near the gates to permit injection. This arrangement relieves the requirement for the accuracy of the temperature control and is advantageous for molding resins such as nylons whose properties such as viscosity change substantially within a narrow temperature range and accordingly whose critical temperature range in which drooling and/or stringing can be prevented while the mold is opened and at the same time injection can be successfully accomplished without gate clogging during injection stroke is very narrow. Further, by setting said desired temperature to which the temperature of the tubular member is normally controlled (this temperature will be referred to as "the normal temperature", hereinbelow) at a value sufficiently lower than the critical temperature, troubles such as stringing, drooling or the like can be prevented even if the temperature changes from gate to gate due to difference in the surrounding conditions.

It is preferred that the time and duration of the supply said large power to the heating windings be selected so that the resin near the gate is melted immediately before injection to permit injection, though depending upon molding conditions, molding cycle, kind of resin and the like.

In order to return the resin temperature (the temperature of the tubular member) to the normal temperature, power supply to the heating windings may be simply interrupted until the resin temperature (the temperature of the tubular member) is lowered to the normal temperature or the tubular member may be cooled by providing the tubular member with a coolant passage. The coolant passage may be formed integrally with the tubular member or may be formed by winding a tubular member having a high heat transfer rate around the tubular member in close contact therewith. Otherwise the heating windings may be formed of a tubular conductive wire and the coolant may be run therethrough.

Preferably, the temperature control means is provided with a short-circuit detecting means which detects short circuits in the heating windings from the relation between the temperature of the tubular member and the rate of change of the temperature. Since each heating winding has a small number of turns and accordingly has a very small electric resistance, it is very difficult to electrically detect a short circuit in the heating windings. That is, the short-circuit detecting means determines that, when the temperature of a tubular member is abruptly lowered while the temperature of the tubular member is in the control range of the temperature control means, or when the rate of increase of the temperature of a tubular member is smaller than a predetermined value or the temperature of a tubular member is lowered while the temperature is below the control range of the temperature control means, the heating winding wound around the tubular member is short-circuited.

In still another preferred embodiment of the present invention, a heat insulating barrier is provided between the heating windings and the tubular member and the outer wall of a winding assembly for supporting each heating winding is held in contact with a mold surface. Preferably the heat insulating barrier is an air layer.

With this arrangement, the heating windings can be kept at a relatively low temperature by virtue of the heat insulating barrier which limits heat transfer from the tubular member to the heat winding and by virtue of heat dissipation through the mold, whereby deterioration of the surface layer of the windings can be minimized.

MOST PREFERRED FORM FOR CARRYING OUT THE INVENTION

Now, embodiments of the present invention will be described in detail with reference to the drawings.

Figure 1:
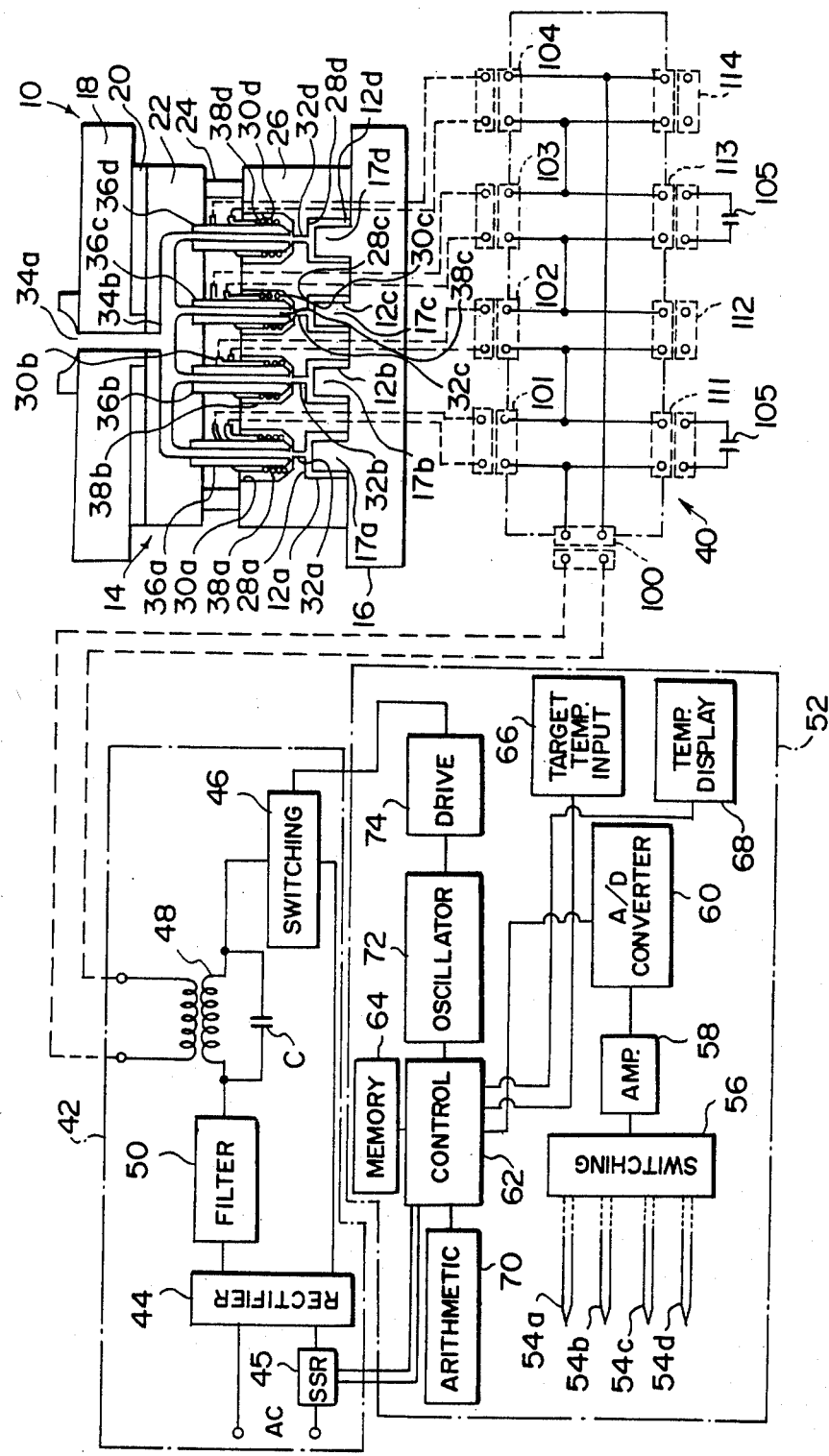
FIG. 1 is a schematic view of a hot-runner plastic injection molding system in accordance with an embodiment of the present invention.

In FIG. 1, a hot-runner plastic injection molding system in accordance with an embodiment of the present invention includes a mold 10 having four cavities 12a, 12b, 12c and 12d. The mold 10 comprises a stationary mold half 14 to be mounted on the stationary platen of a plastic injection machine (not shown) and a movable mold half 16 to be mounted on the movable platen of the plastic injection machine. When the movable mold half 16 is pressed against the stationary mold half 14, that is, when the mold 10 is closed, the cavities 12a to 12d are formed between the stationary and movable mold halves 14 and 16. The stationary mold half 14 comprises a mounting plate 18 to be fixed to the stationary platen, a manifold block 22 which is pressed against the mounting plate 18 with a heat insulating material sandwiched therebetween and is fixed to the mounting plate 18, and a cavity plate 26 which is pressed against the manifold block 22 with support blocks 24 sandwiched therebetween and is fixed to the manifold block 22.

The cavity plate 26 is provided with four cavity recesses 28a, 28b, 28c and 28d opening to the movable mold half 16. The cavity recesses 28a to 28d respectively form said four cavities 12a to 12d together with four core portions 17a, 17b, 17c and 17d when the mold 10 is closed. The cavity plate 26 is further provided with four recesses 30a, 30b, 30c and 30d on the manifold block side thereof. The recesses 30a to 30d are respectively opposed to the cavity recesses 28a to 28d and open to the manifold block 22. The stationary mold half 14 is further provided with a resin passage which is communicated with the cavities 12a to 12d by way of gates 32a, 32b, 32c and 32d formed in the bottom walls of the respective recesses 30a to 30d, and communicates the cavities 12a to 12d with the nozzle of a plastic injection machine (not shown). The resin passage comprises a so-called sprue portion 34a which is immediately connected to the nozzle of the plastic injection machine, and a runner portion 34b branching from the sprue portion 34a. The portions of the runner portion 34b adjacent to the gates 32a to 32d are respectively formed of tubular tips 36a, 36b, 36c and 36d. Heating windings 38a, 38b, 38c and 38d are respectively wound around the tips 36a to 36d. As will be described in detail later, the tips 36a to 36d generated heat when the heating windings 38a to 38d are supplied with a high frequency current. The manifold block 22 is heated to a desired temperature by a suitable heating means not shown.

As in the conventional hot-runner plastic injection molding systems, molten resin injected into the sprue portion 34a from the nozzle of the plastic injection machine is loaded in the cavities 12a to 12d through the resin passage. Generally, the cavity plate 26 and the movable mold half 16 are cooled, and after the resin in the cavities 12a to 12d is cooled to harden, the movable mold half 16 is retracted away from the stationary mold half 14 to open the mold 10. At this time, the articles formed in the cavities 12a to 12d are removed from the stationary mold half 16 carried by the core portions 17a to 17d.

The heating windings 38a to 38d are connected to a high-frequency power supply circuit 42 in series with each other by way of a relay box 40. The high-frequency power supply circuit 42 comprises a rectifier 44 which rectifies AC current from an AC source into a DC current (a pulsating current), a solid state relay (SSR) 45 for turning on and off the AC source, a switching device 46 which is repeatedly opened and closed (turn on and off) under the control of a temperature control circuit 52 to be described later, a transformer 48, a capacitor C connected in parallel to the primary winding of the transformer 48, and a filter circuit 50. The heating windings 38a to 38d are connected to the secondary winding of the transformer 48. The temperature control circuit 52 includes four thermocouples 54a to 54d which are positioned in contact with the front end portions of the tips 36a to 36d to detect the temperature of the front end portions of the tips 36a to 36d. The outputs of the thermocouples 54a to 54d are successively input into an amplifier 58 by way of a switching circuit 56, and then input into an A/D converter 60. The temperature information from the thermocouples 54a to 54d is converted into a digital signal by the A/D convertor 60 and then stored in memory 64 under the control of a control circuit 62. To the control circuit 62 are connected a target temperature input circuit 66 and a temperature display circuit 68. The target temperature input circuit 66 inputs into the control circuit 62 a target temperature of the front end portions of the tips 36a to 36d designated by a setting dial, for instance. The target temperature is stored in the memory 64 under the control of the control circuit 62. The control circuit 62 reads out the temperature information from the thermocouples 54a to 54d which have been stored in the memory 64 and substantially represent the temperatures of the front end portions of the tips 36a to 36d at that time, and causes an arithmetic unit 70 to take an average thereof and to calculate the difference between the average value and the target temperature input by the target temperature input circuit 66. The control circuit 62 controls an oscillator 72 according to the difference between the average value and the target temperature to change the output signal of the oscillator 72. In this particular embodiment, the high-frequency power supply circuit is arranged so that larger power is supplied to the heating windings 38a to 38d as the frequency is lowered within a predetermined range, and accordingly, the control circuit 62 controls the oscillator 72 to oscillate at a lower frequency as the difference between the average value and the target temperature becomes larger. In this embodiment, the oscillator 72 oscillates at a frequency between 20 KHz and 50 KHz. The output signal of the oscillator 72 is currentamplified by a drive circuit 74 and drives said switching device 46 of the high-frequency power supply circuit 42. When the switching device 46 repeatedly opens and closes at a rate corresponding to the oscillating frequency of the oscillator 72, a high frequency current flows through the primary winding of the transformer 48 and a high frequency current is induced in the secondary winding of the transformer 48, whereby the heating windings 38a to 38d are supplied with a high frequency current. When a high frequency current flows through the heating windings 38a to 38d, the tips 36a to 36d are heated by electromagnetic induction. Of course, the tips 36a to 36d are formed of material which can be heated by high frequency induction heating. Though there have been known various materials which can be heated by high frequency induction heating, the material of the tips 36a to 36d should be selected taking into account various properties required for the tips 36a to 36d. For example, the tips 36a to 36d must be resistant to high pressure and high temperature. Preferably the material of the tips 36a to 36d has a high mechanical strength and a high magnetic permeability at elevated temperature, and it is further preferred that the temperature dependence of the magnetic permeability of the material be relatively low. For example, hot-die steel SKD-61, 62 can meet these requirements. The temperature control circuit 52 repeats the comparison of the target temperature and the average of the actual temperatures of the front end portions of the tips 36a to 36d input from the thermocouples 54a to 54d, and while the former is higher than the latter, the temperature control circuit 52 increases the oscillating frequency of the oscillator 72 as the difference therebetween becomes smaller. As the oscillating frequency is increased, the frequency of the current flowing through the primary winding of the transformer 48 increases, and the frequency of the current supplied to the heating windings 38a to 38d is thereby increased to reduce the power to be supplied to the heating windings 38a to 38d. That is, while the actual temperature of the front end portion of the tips 36a to 36d is lower than the target temperature, the temperature control circuit 52 supplies the heating windings 38a to 38d with power which is large when the difference between the actual temperature and the target temperature is large and is reduced as the actual temperature approaches the target temperature, thereby converging the actual temperature of the front end portion of the tips on the target temperature. On the other hand, when the actual temperature exceeds the target temperature, the temperature control circuit 52 reduces the power to be supplied to the heating windings 38a to 38d by an amount which is increased with the difference between the actual temperature and the target temperature so that the actual temperature approaches the target temperature. The temperature display circuit 68 displays the actual temperature of the front end portions of the tips 36a to 36d, the difference between the actual temperature and the target temperature, and the like. Since the tips 36a to 36d themselves generates heat in the system of this embodiment in which the tips 36a to 36d are heated by high frequency induction heating, thermal response is quicker as compared with a system in which the tips are heated by heat transfer from resistance heaters, and the temperature of the tips can be precisely controlled without delay due to ringing, heat transfer and the like.

The SSR 45 is connected to the control circuit 62 and is opened and closed with a predetermined period. For example, the SSR 45 is opened for 10 milliseconds every 0.5 seconds. That is, the control circuit 62 turns off the AC source at a predetermined period to interrupt output of the high-frequency power supply circuit 42, and causes the temperature information from the thermocouples 54a to 54d to be stored in the memory 64 so that the temperature signal from the thermocouples 54a to 54d can be read without influence of high frequency magnetic field established by the heating windings 38a to 38d near the thermocouples 54a to 54d. Though the period and the time interval to open the SSR 45 need not be limited to the values described above, if the period is too long, the frequency of temperature detection becomes too low, which is not preferred from the viewpoint of temperature control especially in the system of this embodiment exhibiting an excellent thermal response. Further, if the period with which the SSR 45 is opened is excessively short and/or the time interval for which the SSR 45 is opened each time is excessively long, the time for which the heating windings 38a to 38d are supplied with power is shortened to elongate the time required to raise the temperature of the tips 36a to 36d to a desired temperature. Therefore, the period with which the SSR 45 is opened and the time interval for which the SSR 45 is opened each time should be selected taking into account these conditions.

The SSR 45 is preferably of a zero-cross type which does not open until the voltage of the AC source becomes zero even if an open signal is input from the control circuit 62 and does not close until the voltage of the AC source becomes zero even if a closure signal is input from the control circuit 62.

The control circuit 62 maximizes the power to be supplied to the heating windings 38a to 38d for a predetermined time interval in response to a signal from the injection molding machine (not shown) as will be described in detail later.

Generally, the control circuit 62 may comprise a micro processor. The operation of the micro processor for accomplishing the control described above will be described with reference to the flow chart shown in FIG. 6.

Figure 6:
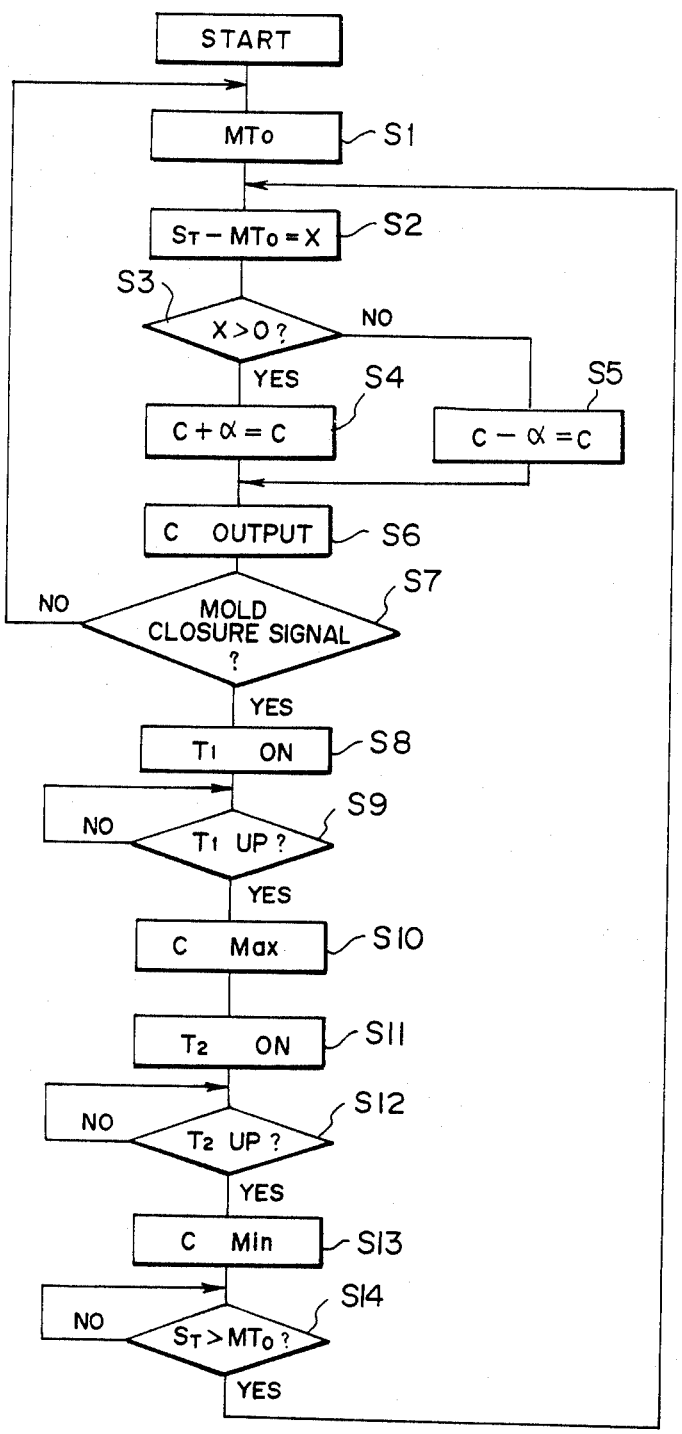
FIG. 6 is a flow chart for illustrating a part of the operation of the control circuit employed in the system of FIG. 1, and FIGS. 7 to 11 are cross-sectional views respectively showing modifications of the tip and the parts associated therewith.

In FIG. 6, the control circuit (micro processor) 62 opens the SSR 45 and at the same time, successively reads the outputs To of the thermocouples 54a to 54d by operating the switching circuit 56 and calculates an average MTo of the outputs To. (Step S1) In step S2, the control circuit 62 calculates the difference X between the target temperature $S_T$ and the average MTo of the outputs To of the thermocouples 54a to 54d. Then the control circuit 62 determines whether or not the target temperature is higher than the average MTo (whether or not the difference X is positive.) in step S3. When the difference X is larger than zero (positive), the control circuit 62 adds a value $a(\geq 0)$ corresponding to the absolute value of the difference X to a control value C and inputs the sum of them into the oscillator 72. (Steps S4 and S6) When the difference X is not larger than zero, the control circuit 62 subtracts a value $a(\geq 0)$ corresponding to the absolute value of the difference X to the control value C and inputs the difference therebetween into the oscillator 72. (Steps S5 and S6) Then in step S7, the control circuit 62 determines whether or not a mold closure starting signal has been input from the injection molding machine. When it is not determined that the mold closure starting signal has been input, the control circuit 62 returns to the step S1 and repeats the step S1 to S7. When it is determined that the mold closure starting signal has been input, the control circuit 62 turns on a timer T1. (Step S8) The timer T1 determines the time at which the power to be supplied to the heating windings 38a to 38d is maximized, and when the timer T1 expires (Step S9), the control circuit 62 maximizes the control value C and inputs it into the oscillator 72 in step S10 and, at the same time, turns on a timer T2 in step S11. The timer T2 determines the time interval for which the control value C is kept maximized, i.e., the time interval for which the power to be supplied to the heating windings 38a to 38d is kept maximized, and the control value C is kept maximized until the timer T2 expires. When the timer T2 expires (Step S12), the control value C is minimized or nullified. (Step S12) Then in step S14, it is determined whether or not the average MTo of the outputs T0 of the thermocouples 54a to 54d is lowered below the target temperature $S_T$. While the average MTo is higher than the target temperature $S_T$, the control value C is kept minimized. When the average MTo becomes lower than the target temperature $S_T$, the control circuit 62 returns to the step S2 to control the temperature of the tips 36a to 36d so that the average MTo converges on the target temperature $S_T$.

The timer T1 is for determining the time the power to be supplied to the heating windings 38a to 38d is maximized, and the timer T2 is for determining the duration for which the power to be supplied to the heating windings 38a to 38d is kept maximized, and they are set so that the resin near the gates is melted to permit injection immediately before each injection stroke taking into account the kind of resin, the normal temperature (said target temperature), the molding cycle time and the like. By thus arranging so that the heating windings 38a to 38d are provided with a large power immediately before each injection stroke, the normal temperature (the target temperature) can be set below the critical temperature at which stringing and drooling cannot occur and at the same time, gate clogging cannot occur, and accordingly, disturbance of the gate balance can be accepted to a certain extent, whereby the requirement for the accuracy of the temperature control is relieved and accordingly the temperature control is facilitated.

Though, in the flow chart shown in FIG. 6, the control value C is maximized to maximize the power to be supplied to the heating windings 38a to 38d in order to permit injection, the power to be supplied to the heating windings 38a to 38d to permit injection need not be the maximum so long as it is sufficient to obtain a desired increase of the resin temperature. In this case, instead of maximizing the control value C in the step S10, a value α corresponding to the desired increase of the resin temperature is added to the control value C and the sum of them is input into the oscillator 72 as the control value C.

Further, though in the flow chart shown in FIG. 6, the mold closure starting signal is used as the signal from the injection molding machine, the signal from the injection molding machine may be any signal so long as it is output from the injection molding machine at a fixed time in each molding cycle.

Figure 2:
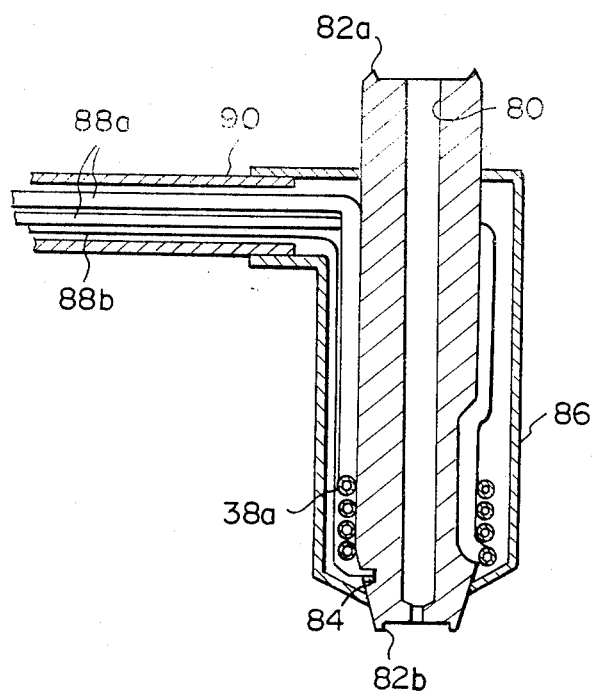
FIG. 2 is a cross-sectional view showing in detail a part of the system of FIG. 1.

FIG. 2 shows in detail the structure of the tip 36a and the parts associated therewith as a representative of the tips 36a to 36d and the parts associated therewith.

As shown in FIG. 2, the tip 36a is a pipe-like member having a bore 80 which forms the part of the resin passage adjacent to the gate. The bore 80 is tapered toward the front end (the side adjacent to the gate 32a) and has a diameter substantially equal to the diameter of the gate 32a at the portion immediately adjacent to the gate 32a. The tip 36a is provided with a pair of annular protrusions 82a and 82b on opposite end faces. The tip 36a is sandwiched under pressure between the manifold block 22 and the cavity plate 22, and the protrusions 82a and 82b are slightly deformed to prevent the molten resin from leaking between the contact faces. Other various sealing means such as an O-ring may be used. Further, the protrusion 82b on the front end face of the tip 36a narrows the contact area between the tip 36a and the cavity plate 26 to reduce the quantity of heat to be transferred from the front end of the tip 36a to the cavity plate 26. The tip 36a is provided, at the front end portion, with a recess 84 for receiving the tip of the thermocouple 54a. The heating winding 38a and the thermocouple 54a are accommodated in a casing 86 formed of a metal having a high frequency shield effect.

The leads 88a of the heating winding 38a and the leads 88b of the thermocouple 54a extend to the relay box 40 through a shield tube 90 integrally connected to the casing 86. The heating winding 38a comprises a core wire of metal such as silver, alloys of silver, copper or the like which is highly conductive and resistant to corrosion, and an insulating material on the core wire. The heating winding 38a is wound around the tip 36a generally by several to ten and several turns depending on the size of the tip 36a and the like. Since the rear end portion of the tip 36a is heated by heat transfer from the manifold block 22 and the front end portion of the tip 36a is cooled by heat transfer to the cavity plate 26, it is preferred that the heating winding be wound around the tip 36a as near to the front end as possible so that the magnetic flux from the heating winding 38a is concentrated to the front end portion of the tip 36a.

Figure 3:
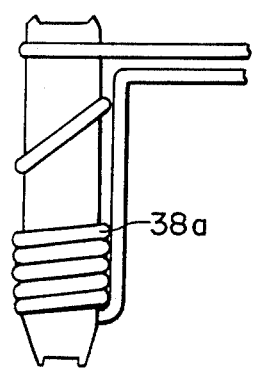
FIG. 3 is a view for illustrating an example of the manner of winding the heating winding around the tubular member.
Figure 4:
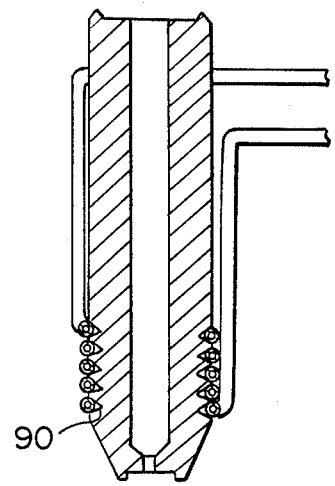
FIG. 4 is a view showing an example of the method of fixing the heating winding.

When the tip is long and a relatively large quantity of heat is dissipated from the central portion thereof, the heating winding 38a may be wound around the tip densely at the front end portion and thinly at the central portion and the rear end portion as shown in FIG. 3. Though whether or not the heating winding 38a is in close contact with the outer surface of the tip 36a hardly affect the temperature of the front end portion of the tip 36a, the position of the heating winding 38a in the longitudinal direction of the tip 36a and the density of turn of the heating winding 38a substantially affects the temperature of the front end portion of the tip 36a. Therefore, it is preferred that the heating winding 38a is secured to the tip 36a. The heating winding 38a may be secured to the tip 36a by heat-resistant adhesive, for example. Otherwise, a spiral groove 90 is cut in the outer surface of the tip 36a according to the desired winding pattern of the heating winding 38a, and the heating winding 38a may be wound along the spiral groove 90 as shown in FIG. 4.

Said relay box 40 has a connector for connecting the secondary winding of the transformer 48 of the high-frequency power supply circuit 42, and connectors 101, 102, 103 and 104 respectively for connecting the heating windings 38a to 38d. The connectors 101 to 104 are connected to the connector 100 in series with each other. Gate balance adjustment connectors 111, 112, 113 and 114 each for connecting a gate balance adjustment circuit are connected in parallel to the connectors 101 to 104, respectively. By connecting the gate balance adjustment circuit(s) to the selected gate balance adjustment connector(s), the temperature of the tips 36a to 36d can be controlled individually. In FIG. 1, capacitors 105 are connected in parallel to the heating windings 38a and 38c by way of the gate balance adjustment connectors 111 and 113 by way of example. In this case, the temperature of the tips 36a and 36c around which the heating windings 36a and 36c are wound is raised while the temperature of the tips 36b and 36d around which the other heating windings 38b and 38d are wound is lowered. When windings or resistors are connected in parallel to the heating windings 38a and 38c instead of the capacitors, the temperature of the tips 36a and 36c corresponding to the heating windings 38a and 38c is lowered and the temperature of the tips 36b and 36d corresponding to the other heating windings 38b and 38d is raised. That is, by connecting one or more gate balance adjustment circuits such as a capacitor, winding, resistor and the like in parallel to a selected heating winding or selected heating windings, distribution of powers to the heating windings 38a to 38d can be changed and the temperature of the tips 36a to 36d can be individually raised and lowered. For example, when the temperature of one of the tips 36a to 36d is apt to be lower than the temperature of the other tips for some reason, a capacitor may be connected in parallel to the heating winding corresponding to the tip by way of the gate balance adjustment connector so that the heating winding is supplied with a power larger than the other heating windings. On the other hand, when the temperature of one of the tips 36a to 36d is apt to be higher than the temperature of the other tips for some reason, a winding or resistor may be connected in parallel to the heating winding corresponding to the tip by way of the gate balance adjustment connector so that the heating winding is supplied with a power smaller than the other heating windings. Capacitors, windings and resistors may be used together in combination with each other if desired. However, when a resistor is used as the gate balance adjustment circuit, power loss occurs. From this viewpoint, a capacitor or a winding is advantageous over a resistor. The degree of the temperature change by the gate balance adjustment circuit depends upon the value of the gate balance adjustment circuit. A gate balance adjustment circuit of a proper value may be selected by the operator taking into account the temperature display or the state of resin at each gate and may be manually connected to the corresponding gate balance adjustment connector. Otherwise, a plurality of gate balance adjustment circuits may be provided for each heating winding so that one of them is selectively connected according to the difference in temperature between the tips 36a to 36d.

Figure 5:
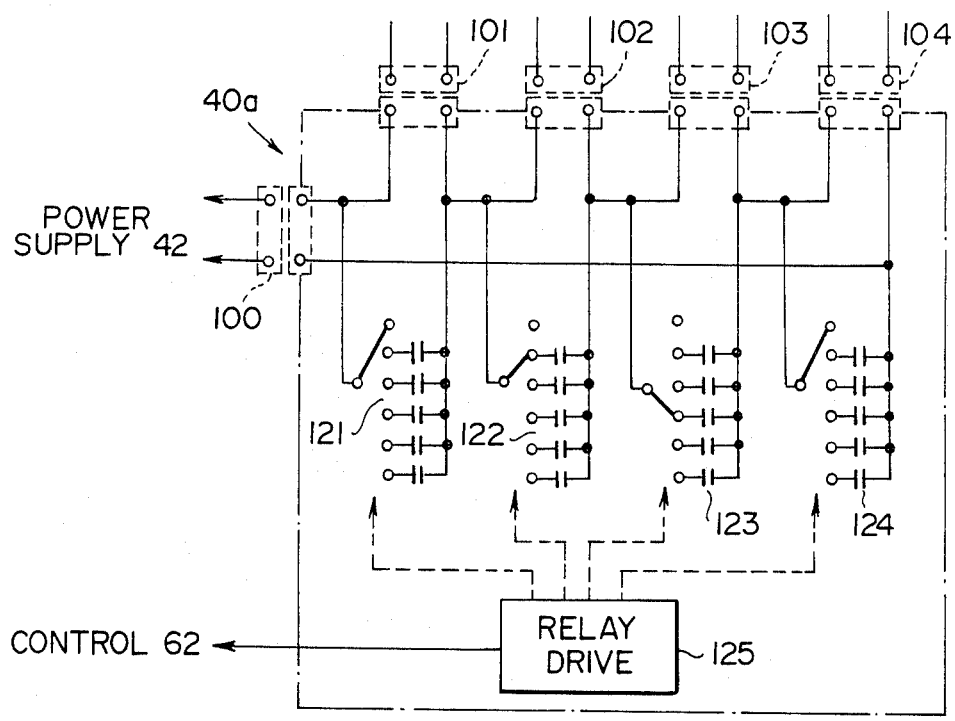
FIG. 5 is a view for illustrating a modification of the system of FIG. 1.

In the latter case, selected one of the gate balance circuits may be automatically connected under the control of the control circuit 62 as shown in FIG. 5. That is, in the relay box 40a shown in FIG. 5, the gate balance adjustment connectors respectively comprise relays 121, 122, 123 and 124, each having six fixed contacts and a single movable contact selectively connected to one of the fixed contacts. Five of the six fixed contacts of each relay are connected to capacitors having different values and the other fixed contact is opened. The relays 121 to 124 are driven by a relay driving circuit 125 which is controlled by the control circuit 62. The control circuit 62 controls the relay driving circuit 125 so that the relays 121 to 124 to connect selected one of the capacitors in parallel to the heating windings 38a to 38d according to the difference between the temperatures of the tips 36a to 36d input from the thermocouples 54a to 54d.

Though the thickness of the leads introduced into the mold 10 is practically limited, it is preferred that the line between the high-frequency power supply circuit and the relay box 40 be as thick as possible and have a minimum possible high frequency resistance and the relay box 40 be disposed in the nearest possible position to the mold 10 so that the resistance loss of the line between the high-frequency power supply circuit and the heating windings 38a to 38d including skin effect is minimized.

Though, in the embodiment described above, the temperature of the tips 36a to 36d is lowered to the normal temperature (the target temperature) after each injection stroke (after the timer T2 expires), by minimizing the control value C or interrupting power supply to the heating windings 38a to 38d, the temperature of the tips 36a to 36d may be positively lowered to the normal temperature by cooling the tips 36a to 36d with water or the like.

Figure 7:
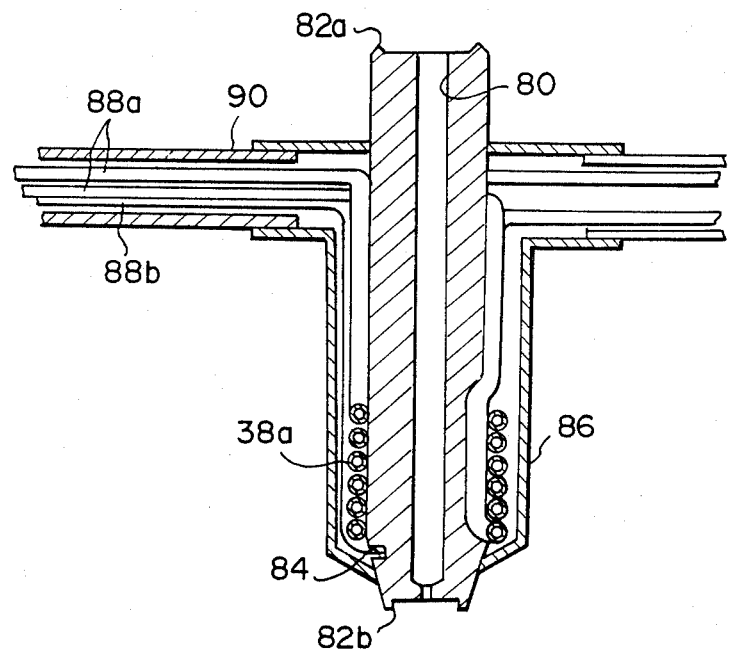
Figure 8:
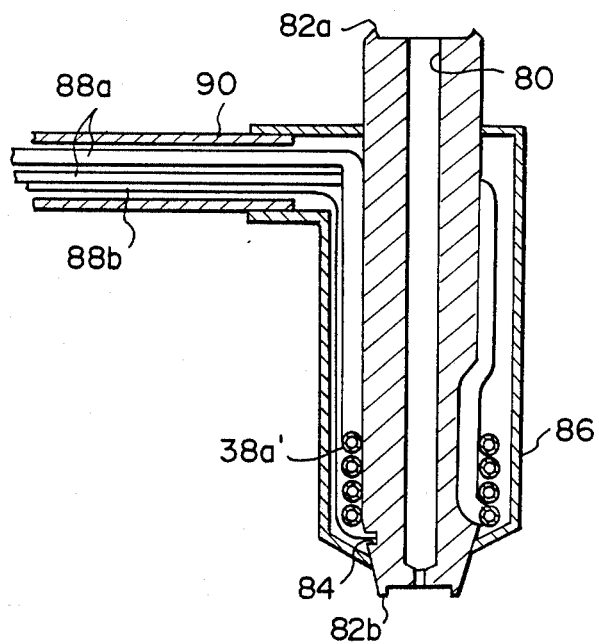

This may be accomplished by flowing coolant through a coolant pipe P wound around the tip between turns of the heating winding as shown in FIG. 7, or by forming the heating winding by a tubular conductive member 38a' and by flowing coolant through the tubular conductive member as shown in FIG. 8. In the latter case, the structure associated with the tips 36a to 36d can be prevented from being complicated and at the same time, oxidization of the heating windings can be prevented.

Figure 9:
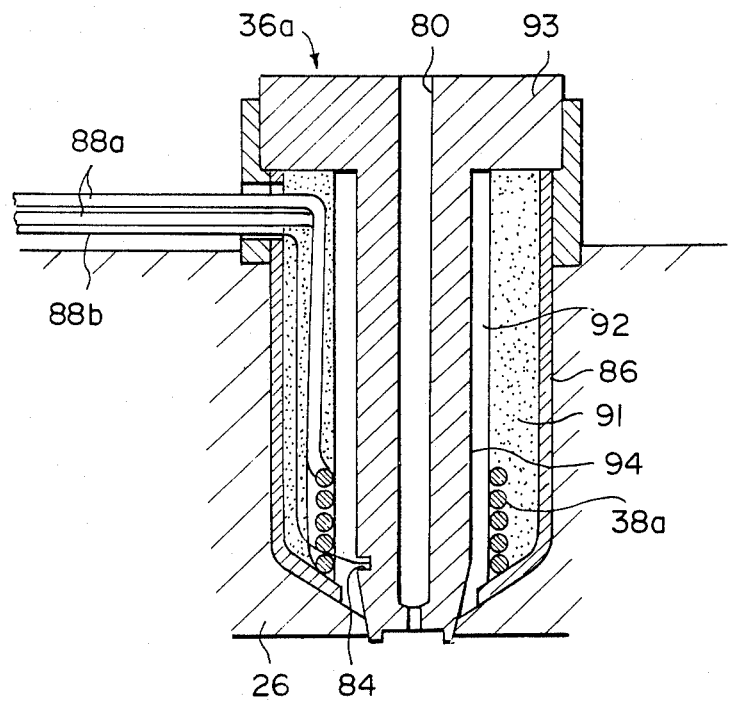

FIG. 9 shows an example of the structure of the tip and the parts associated therewith. In this example, the tip 36a is provided with a flange 93 at the top thereof, and the heating winding 38a is held by a casing 86 by way of filler 91 with an air heat-insulating layer 92 of about 1 mm thick being formed between the outer surface 94 of the portion of the tip 36a below the flange 93 and the heating winding 38a. The outer surface of the casing 86 is in contact with the cavity plate 26.

With this arrangement, since transfer of heat of the tip 36a to the heating winding 38a is limited by the air heat-insulating layer 92 and since heat of the heating winding 38a can be dissipated, by way of the filler 91 and the casing 86, to the cavity plate 26 which is normally cooled, the heating winding 38a can be kept at a relatively low temperature. For this purpose, it is preferred that the filler 91 and the casing 86 be of materials having high heat transfer rates.

The air heat-insulating layer 92 hardly affects the heating efficiency so long as the thickness of the air heat-insulating layer 92 does not exceed a certain limit. For example, in case that the length of the heating winding is 20 mm, the inner diameter of the winding is 7 mm and the outer diameter of the same is 9 mm, an air heat-insulating layer of 1 mm thick hardly affects the heating efficiency.

A pipe 95 formed of a material such as mica which cannot affect high frequency induction heating may be provided inside the heating winding 38a in order to facilitate casting of the filler 91.

Figure 10:
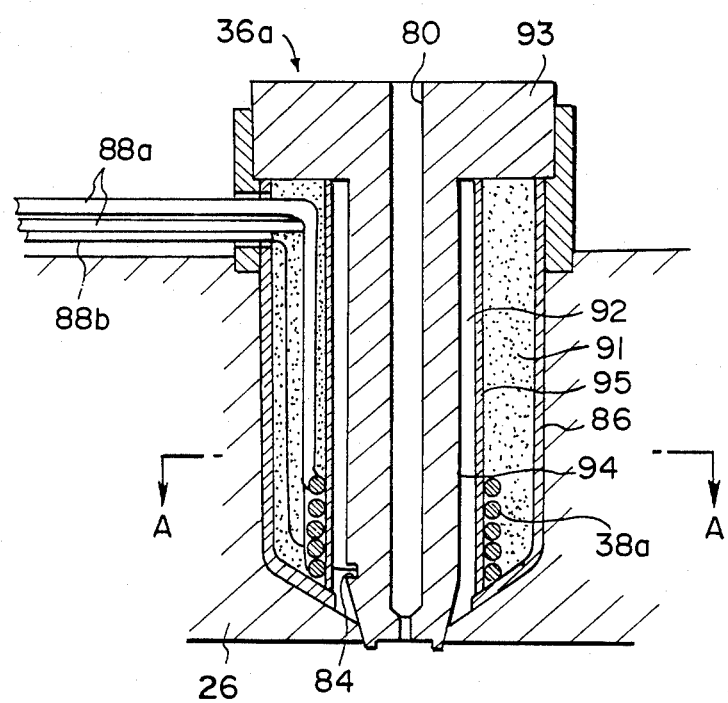
Figure 11:
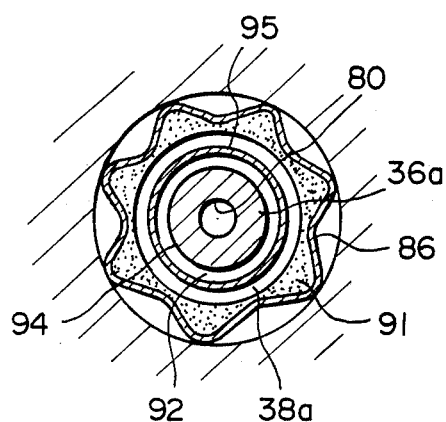

Further, though, in the example described above, the casing 86 is cylindrical and is in contact with the cavity plate 26 over the entire outer surface, the casing 86 may be arranged to be in contact with the cavity plate 26 at a part of the outer surface as shown in FIG. 11 (which is a cross-sectional view taken along line A-A in FIG. 10).

The tip 36a may be separable from the winding assembly (formed by the casing 86, the filler 91, the heating winding 38a and the mica pipe 95) or may be integral therewith.

Preferably, the casing 86 is formed of non-magnetic material such as stainless steel or aluminum, and the filler is of ceramics.

In the system of this embodiment, the control circuit 62 is provided with means for detecting a short circuit of the heating windings 38a to 38d. Since the electric resistance of the heating windings 38a to 38d is very small, change in resistance of the circuitry including the heating windings 38a to 38d hardly appears, and accordingly, it is very difficult to electrically detect a short circuit of the heating windings 38a to 38d on the basis of change in current, voltage or the like. Therefore, the control circuit 62 is provided with means for detecting a short circuit on the basis of the temperature of the front end portions of the tips 36a to 36d detected by the thermocouples 54a to 54d and the change of rate of the temperature.

That is, the control circuit 62 controls the power to be supplied to the heating windings 38a to 38d so that the temperature of the front end portion of the tips 36a to 36d is raised with a high rate while the temperature of the front end portions of the tips 36a to 36d is lower than a predetermined reference temperature (e.g., 150° C.) below the critical temperature range in which drooling or stringing does not occur, and is controlled to be held substantially constant in the molding temperature range above the predetermined reference temperature. Therefore, if the increase in temperature of one or more of the tips 36a to 36d is dull or the temperature of one or more of the tips 36a to 36d is lowered while the temperature of the tips 36a to 36d is below the predetermined reference temperature, it may be determined that the heating winding corresponding to the tip is short-circuited. Further, if the temperature of one of the tips 36a to 36d is lowered at a rate higher than a predetermined value while the temperature of the tips 36a to 36d is higher than the predetermined reference temperature, it may be determined that the heating winding corresponding to the tip is short-circuited.

Though, in the embodiment described above, there is used as the high-frequency power supply circuit 42 a commutated type circuit in which the power supply is increased as the frequency is lowered, there may be used a deflecting type circuit in which the power supply is increased as the frequency is increased. Further, though, in the embodiment described above, the temperature control circuit 52 controls the temperature of the front end portions of the tips 36a to 36d on the basis of comparison of the average of the actual temperatures of the front end portions of the tips 36a to 36d and the target temperature, the temperature control circuit 52 may be arranged to control the temperature on the basis of comparison of the actual temperature of the front end portion of one of the tips 36a to 36d and the target temperature.

We claim:

1. A hot-runner plastic injection molding system comprising a mold which has stationary and movable mold halves, and is provided with a plurality of cavities which is defined when the mold is closed and with a resin passage which communicates the cavities with the nozzle of a plastic injection machine to feed molten resin to each cavity through a gate open thereto, and a heating means for heating the resin passage to keep resin in the resin passage in a molten state, said heating means including a plurality of tubular members, characterized in that at least part of the resin passage near to each gate is formed by one of said tubular members of material which can be heated by high frequency induction heating, and said heating means comprises a plurality of high frequency induction heating windings which are respectively wound around the tubular members and are connected in series with each other, a high frequency power supplying means for supplying the high frequency induction heating windings with high frequency power, and a temperature control means which controls the power to be supplied to the high frequency induction heating windings from the high frequency power supplying means according to a temperature signal from a temperature detecting means, thereby controlling the temperature of the tubular members to a target temperature.

2. A molding system as defined in claim 1 in which the frequency of said high frequency power to be supplied to the high frequency induction heating windings is from 20 KHz to 50 KHz.

3. A molding system as defined in claim 1 or 2 in which each of said heating windings is wound around the tubular member densely at a portion near to the gate.

4. A molding system as defined in claim 3 in which each of said heating windings is wound around the tubular member densely at a portion near to the gate and thinly at the middle between ends thereof.

5. A molding system as defined in claim 1 in which each of the heating windings is fixed in a spiral groove formed in the outer surface of the tubular member.

6. A molding system as defined in claim 1 in which said heating means includes connecting means for connecting a gate balance adjustment circuit for each of said heating windings, the gate balance adjustment circuit being connected in parallel to the corresponding heating windings to change power distribution to the heating winding.

7. A molding system as defined in claim 6 in which said heating means is provided with a switching means which interrupts power supply to the heating windings from the high frequency power supplying means with a predetermined period for a predetermined time interval and said temperature control means reads the temperature signal while the power supply is interrupted.

8. A molding system as defined in claim 7 in which said temperature control means supplies to the heating windings with power larger than needed to control the temperature of the tubular members to said target temperature for a predetermined time interval in response to a signal from the injection molding machine.

9. A molding system as defined in claim 8 in which said heating means includes a short circuit detecting means which calculates the rate of change in the temperature of the tubular members on the basis of the temperature signal from the temperature detecting means, and detects a short circuit of the heating windings on the basis of relation between the rate of change in the temperature of the tubular members and the temperature of the tubular members represented by the temperature signal.

10. A molding system as defined in claim 9 in which each of said heating windings is held by a holding member to form a winding assembly, the holding member being arranged to hold the heating winding with a heat-insulating layer intervening between the heating winding and the outer surface of the tubular member.

11. A molding system as defined in claim 10 in which the outer wall of said winding assembly is in contact with said mold.

12. A molding system as defined in claim 11 in which said winding assembly is integral with the tubular member.

13. A molding system as defined in claim 11 in which said winding assembly is separated from the tubular member.

14. A molding system as defined in claim 11 in which said heat-insulating layer is of air.

15. A molding system as defined in claim 6 in which said temperature control means supplies to the heating windings with power larger than needed to control the temperature of the tubular members to said target temperature for a predetermined time interval in response to a signal from the injection molding machine.

16. A molding system as defined in claim 15 in which said heating means includes a short-circuit detecting means which calculates the rate of change in the temperature of the tubular members on the basis of the temperature signal from the temperature detecting means, and detects a short circuit of the heating windings on the basis of relation between the rate of change in the temperature of the tubular members and the temperature of the tubular members represented by the temperature signal.

17. A molding system as defined in claim 1 in which said heating means is provided with a switching means which interrupts power supply to the heating windings from the high frequency power supplying means with a predetermined period for a predetermined time interval and said temperature control means reads the temperature signal while the power supply is interrupted.

18. A molding system as defined in claim 17 in which said temperature control means supplies to the heating windings with power larger than needed to control the temperature of the tubular members to said target temperature for a predetermined time interval in response to a signal from the injection molding machine.

19. A molding system as defined in claim 18 in which said heating means includes a short-circuit detecting means which calculates the rate of change in the temperature of the tubular members on the basis of the temperature signal from the temperature detecting means, and detects a short circuit of the heating windings on the basis of relation between the rate of change in the temperature of the tubular members and the temperature of the tubular members represented by the temperature signal.

20. A molding system as defined in claim 19 in which each of said heating windings is held by a holding member to form a winding assembly, the holding member being arranged to hold the heating winding with a heat-insulating layer intervening between the heating winding and the outer surface of the tubular member.

21. A molding system as defined in claim 17 in which said heating means includes a short-circuit detecting means which calculates the rate of change in the temperature of the tubular members on the basis of the temperature signal from the temperature detecting means, and detects a short circuit of the heating windings on the basis of relation between the rate of change in the temperature of the tubular members and the temperature of the tubular members represented by the temperature signal.

22. A molding system as defined in claim 1 in which said temperature control means supplies to the heating windings with power larger than needed to control the temperature of the tubular members to said target temperature for a predetermined time interval in response to a signal from the injection molding machine.

23. A molding system as defined in claim 22 in which said heating means includes a short-circuit detecting means which calculates the rate of change in the temperature of the tubular members on the basis of the temperature signal from the temperature detecting means, and detects a short circuit of the heating windings on the basis of relation between the rate of change in the temperature of the tubular members and the temperature of the tubular members represented by the temperature signal.

24. A molding system as defined in claim 23 in which each of said heating windings is held by a holding member to form a winding assembly, the holding member being arranged to hold the heating winding with a heat-insulating layer intervening between the heating winding and the outer surface of the tubular member.

25. A molding system as defined in claim 1 in which said heating means includes a short-circuit detecting means which calculates the rate of change in the temperature of the tubular members on the basis of the temperature signal from the temperature detecting means, and detects a short circuit of the heating windings on the basis of relation between the rate of change in the temperature of the tubular members and the temperature of the tubular members represented by the temperature signal.

26. A molding system as defined in claim 1 in which each of said heating windings is held by a holding member to form a winding assembly, the holding member being arranged to hold the heating winding with a heat-insulating layer intervening between the heating winding and the outer surface of the tubular member.

27. A molding system as defined in claim 26 in which the outer wall of said winding assembly is in contact with said mold.

28. A molding system as defined in claim 27 in which said winding assembly is integral with the tubular member.

29. A molding system as defined in claim 27 in which said winding assembly is separated from the tubular member.

30. A molding system as defined in claim 27 in which said heat-insulating layer is of air.

* * * * *